United States Patent
Okamoto et al.

(10) Patent No.: US 6,215,527 B1
(45) Date of Patent: Apr. 10, 2001

(54) VIDEO SIGNAL CONTOUR CORRECTING CIRCUIT

(75) Inventors: Hiroshige Okamoto; Yoko Takahashi, both of Kanagawa; Masaru Miyamoto; Atsuko Tsukimura, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/347,357

(22) Filed: Jul. 6, 1999

(30) Foreign Application Priority Data

Jul. 8, 1998 (JP) .................................... 10-193248

(51) Int. Cl.[7] ..................................... H04N 5/21
(52) U.S. Cl. ..................... 348/625; 348/606; 382/266
(58) Field of Search ..................... 348/625, 627, 348/628, 629, 631, 606; 382/266, 269

(56) References Cited

U.S. PATENT DOCUMENTS

| | | | |
|---|---|---|---|
| 4,360,830 | * 11/1982 | Poetsch et al. | 348/628 |
| 4,393,407 | * 7/1983 | Yokomizo | 348/625 |
| 4,541,014 | * 9/1985 | Yagi | 348/625 |
| 5,243,427 | * 9/1993 | Yu | 348/607 |
| 5,491,520 | * 2/1996 | Nozawa et al. | 348/625 |
| 5,561,473 | * 10/1996 | Saionji et al. | 348/628 |
| 6,088,065 | * 7/2000 | Uchida | 348/625 |

\* cited by examiner

Primary Examiner—John K. Peng
Assistant Examiner—Trang U. Tran
(74) Attorney, Agent, or Firm—Frommer Lawrence & Haug, LLP.; William S. Frommer

(57) ABSTRACT

An contour correcting circuit for correcting the contour without deterioration of image quality of the video signal, comprising a first HPF for extracting the high frequency signal component of the video signal supplied from an input terminal Tin, a second HPF for differentiating the output of the first HPF additionally, and a correlator for synthesizing the output signals of the output and the inverted output of said first HPF, and the output of the second HPF to form a signal having a predetermined signal waveform, wherein the correlator forms a signal waveform of the preshoot portion and overshoot portion with the first order differential output which is relatively static at the inflection point of the video signal, synthesizes a second order differential waveform so as to be a sharp signal waveform at the middle portion, and performs sharpness processing of the video signal by use of the contour correction signal.

6 Claims, 5 Drawing Sheets

VIDEO SIGNAL CONTOUR CORRECTING CIRCUIT

BACKGROUND OF THE INVENTION

1. Field of the Invention

This invention relates to signal processing of video signals reproduced from a television receiver or a VTR, and more particularly relates to a video signal contour correcting circuit for enhancing the contour of video signals.

2. Description of the Related Art

The video signal reproduced by a recording/reproducing apparatus, the video signal transmitted by a cable, or the video signal imaged by a television camera loses its high frequency component depending on the general transmission band generally, and the sharp rising waveform or the sharp falling waveform of the video signal loses the sharpness of the contour to form a rounded waveform, as the result, the sharpness of an image on a monitor screen is rounded.

An contour correcting circuit for correcting the signal contour by use of a circuit is used.

FIG. 5A is an exemplary correcting circuit for contour correction of the video signal, 21 and 22 denote differential circuit, and 23 denotes a subtraction circuit for subtracting an contour-corrected signal from an original video signal.

FIG. 5B shows the signal waveforms at respective positions on the above-mentioned circuits, (A) is the video signal waveform having the contour which forms a inflection point of the video signal rounded due to the circuit characteristics, (B) is the harmonic signal component (first order differential) of an edge formed by passing the video signal waveform (A) through the first differential circuit 21, and (C) is a quadratic differential waveform signal formed by passing further the signal of (B) through the second differential circuit 22, which (C) is resultantly the signal waveform obtained by differentiating the harmonic component twice.

The signal waveform which has been differentiated twice is provided to the subtraction circuit 23, and subtraction circuit 23 subtracts the provided signal waveform from the original video signal to form a signal having the contour with the inflection point of the video signal which rises steeply and is enhanced as shown in (D).

As described herein above, the signal which has been differentiated twice to correct the contour of the video signal has a waveform contour which rises sharply and falls sharply, however, the high level overshoot Q and preshoot P are added to the original video signal when the contour correction is enhanced, and a needless frame is resultantly added to the original video signal to form an image which seems different from the original image.

On the other hand, if the video signal is subjected to mild differentiation, the sharp contour is not obtained.

SUMMARY OF THE INVENTION

The present invention has been accomplished to mitigate the above-mentioned problem, and is a video signal contour correcting circuit, which is is provided with the first differential circuit for extracting the high frequency component of the video signal, the second differential circuit for differentiating the output of the first differential circuit, and a correlator to which the output of the first differential circuit, the inverted output of the first differential circuit, and the output of the second differential circuit are supplied, wherein, for example, the first order differential output is obtained for the rising portion of the emphasizing signal, the inverted first differential output is obtained for the falling portion of the signal, and the second order differential output is obtained for the middle portion of the signal respectively from the correlator, and the emphasizing signal is overlapped to the input signal.

The first and second filter means may comprise a high frequency band passing filter or sine filter, and otherwise may comprise a delay circuit and a subtracter for subtracting the input/output signal of the circuit.

Particularly in the case that a delay circuit is used, all the circuit elements may easily comprise video signal processor for performing digital signal processing.

DETAILED DESCRIPTION OF THE PREFERRED EMBODIMENTS

Figure 1:
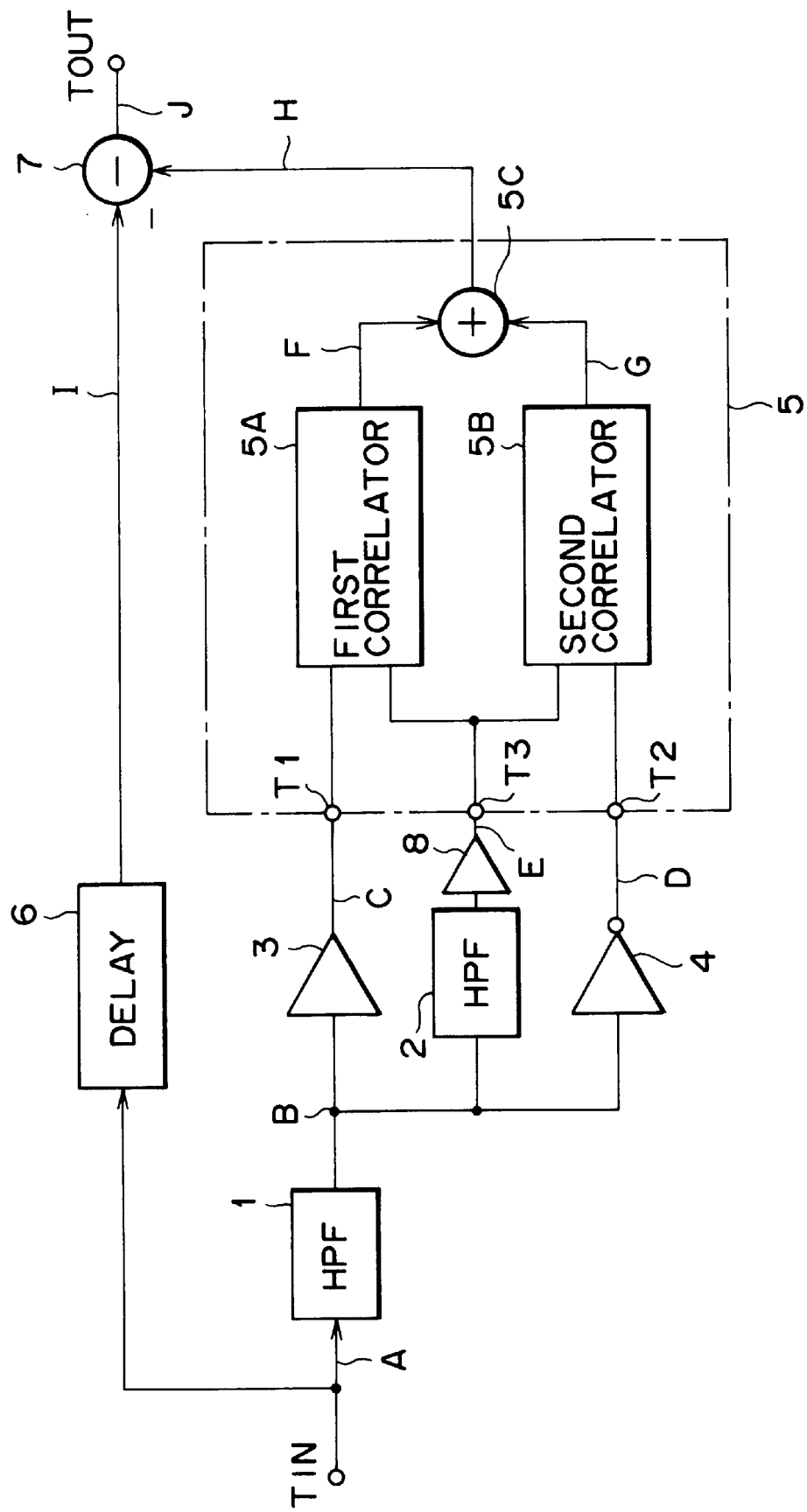
FIG. 1 is a block diagram for illustrating a video signal contour correcting circuit accordance with one embodiment of the present invention.

FIG. 1 is a block diagram for illustrating the first embodiment of the present invention, reference numeral 1 denotes the first HPF (high pass filter) for extracting the harmonic signal component of the video signal supplied from an input terminal Tin, and reference numeral 2 denotes the second HPF for differentiating the output from the first HPF1.

Reference numeral 3 denotes an amplifier for amplifying the signal level to a predetermined signal level, reference numeral 4 denotes an inverting amplifier for inversely amplifying the signal level to the predetermined signal level, and reference numeral 5 denotes a correlator for synthesizing the predetermined signal level of the output signal from the above-mentioned amplifier 3, the inverting amplifier 4, and second HPF2, wherein correlator 5 comprises the first correlator 5A for processing particularly the positive polar signal and the second correlator 5B for processing particularly the negative polar signal.

The contour correction signal supplied from the first and second correlators 5A and 5B is sent out by way of an adder 5C. 6 denotes a delay circuit for delaying the input video signal for a predetermined amount of time, the video signal delayed for the predetermined amount of time by the delay circuit 6 is subjected to subtraction processing by a subtracter 7 together with the contour correction signal supplied from the above-mentioned adder 5C, and the contour-corrected video signal is sent out from an output terminal Tout.

Figure 2:
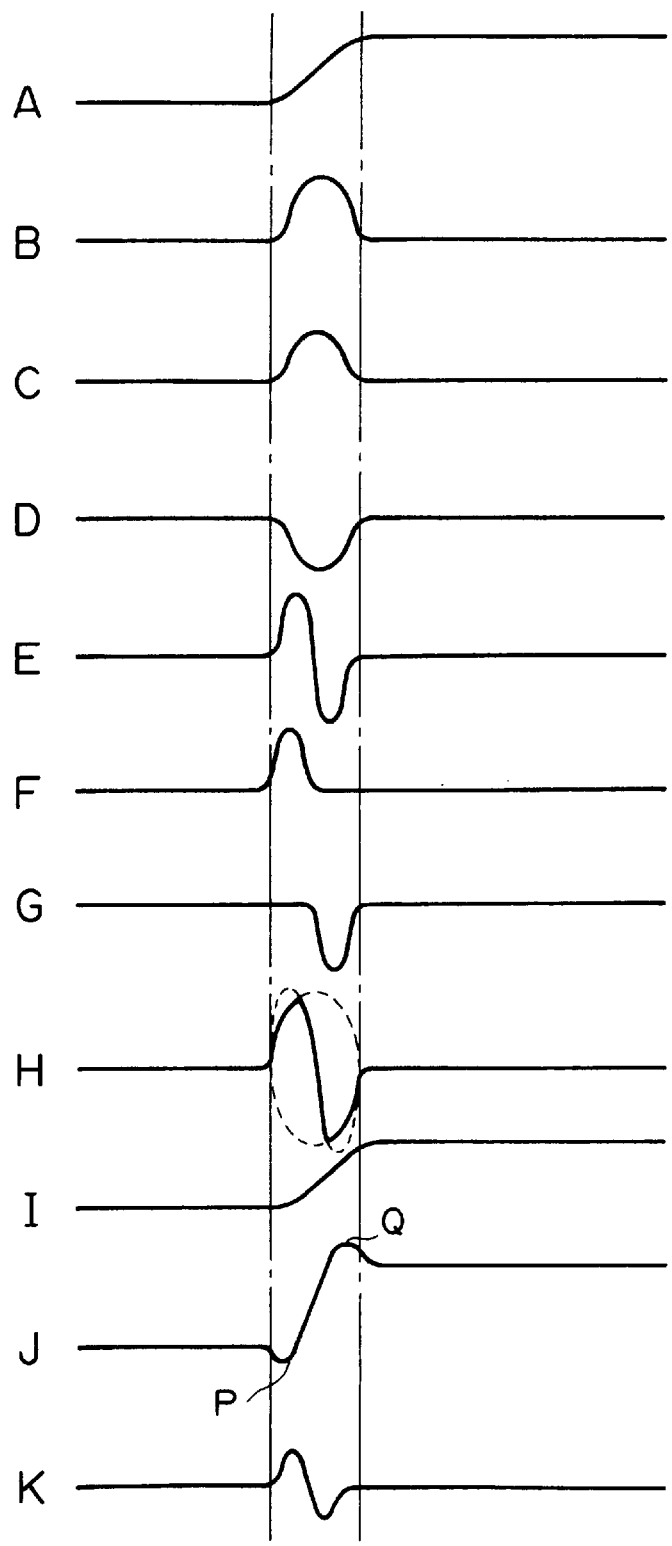
FIG. 2 is a signal waveform diagram for illustrating signal waveforms at respective points shown in FIG. 1.

FIG. 2 shows the signal waveforms at respective positions on the above-mentioned FIG. 1.

Referring to FIG. 2, the signal processing is described herein under. The signal A having a rounded rising portion supplied from the input terminal Tin is differentiated by passing through the first HPF1 so that the signal B which has been differentiated at the level inflection point is sent out, and the differentiated signal C having the signal level shown in FIG. 2 is sent out by way of the amplifier 3.

The signal B is sent out from the inverting amplifier 4 as the signal D.

The differentiated signal B passes through the second HPF2 so that the inflection point of the waveform is differentiated (quadratic differential) by passing through the second HPF2, at that time the differential signal B is converted to a signal K having the positive and negative polarity in the vertical direction, amplified to the signal having a signal level E by the amplifier, and sent out.

A signal waveform is synthesized from the signals C, D, and E obtained by the above-mentioned signal processing by the correlator 5.

As described hereinafter, the first correlator 5A, which is a component of the correlator 5, first extracts the relatively static signal C and the positive level component of the signal E having a sharp signal waveform, and the front half portion is obtained by extracting the rising waveform of the signal C and the rear half portion is obtained by extracting the falling waveform of the signal E to form a whole signal waveform F.

The second correlator 5B extracts the negative component of the signal D and the signal E, and similarly the rear half portion is obtained by extracting the rising waveform of the relatively static signal D and the front half portion is obtained by extracting the falling waveform of the signal E having a sharp waveform to form a whole signal waveform G.

The adder 5C adds the signal F to the signal G to form a signal H.

By subtracting the signal H from the signal A, which has been delayed for a predetermined amount of time by the delay circuit 6, a signal J having the sharp rising contour is formed, and the signal J is sent out from the output terminal Tout as a contour-corrected video signal.

Because the level of the pre-shoot portion P and the level of the overshoot portion Q are first order differential wave, the level is relatively low. Further, the level is adjustable by level setting of the gain of the amplifiers 3 and 8 and the inverting amplifier 4.

Figure 3:
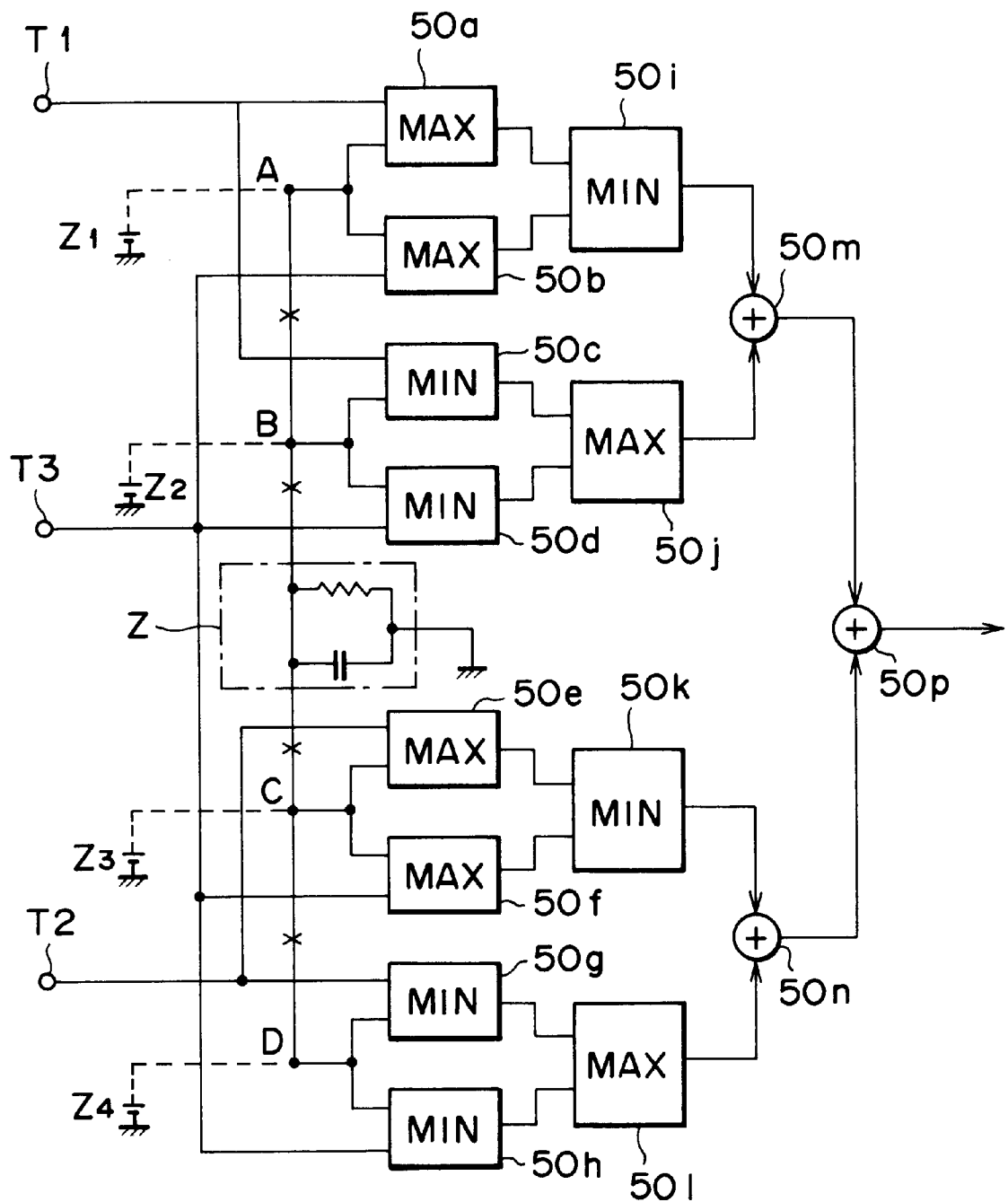
FIG. 3 is a block diagram for illustrating a detailed exemplary correlator for forming an contour correction signal.

FIG. 3 is a block diagram for illustrating the detailed example of the above-mentioned correlator 5. The terminals T1, T2, and T3 receive signal C, signal E, and signal D respectively.

50a to 50l with Max are maximum value selecting circuits for selecting the maximum value from among input signals and 50a to 50l with Min are minimum value selecting circuit for selecting the minimum value from among input signals.

Z denotes a reference voltage source which is, for example, set to zero level in DC, and in this embodiment, the signal of the reference voltage source is supplied to all the maximum value selecting circuits 50(a, b, e, and f) and minimum value selecting circuits 50(c, d, g, and h), however otherwise the reference power sources Z1, Z2, Z3, and Z4 may be connected to the points A, B, C, and D with separation at X marks.

The reference voltage value supplied to the respective maximum value and minimum value selecting circuits may be varied depending on the level and image quality of the video signal.

In the first correlator, the positive level of the first differential relatively static signal C is extracted by use of the maximum value selecting circuit 50a and the positive level of the second order differential signal E is extracted by use of the maximum value selecting circuit 50b.

Further, the negative level (in this case, zero) of the signal C is extracted by use of the minimum value selecting circuit 50c and the negative level of the signal E is extracted by use of the minimum selecting circuit 50d.

In the second correlator, the positive level (in this case, zero) of the inverted signal D having the first order differential waveform is extracted by use of the maximum value selecting circuit 50e and the positive level of the signal E is extracted by use of the maximum selecting circuit 50f.

Further, the negative level of the signal D is extracted by use of the minimum value selecting circuit 50g and the negative level of the signal E is extracted by the minimum selecting circuit 50h.

Further, in the first correlator, the maximum value selecting circuit 50i sends out the signal F consisting of the relatively gradual rising changing front half portion of the signal C and the sharp changing waveform portion of the signal E which falls to zero level, the output of the minimum value selecting circuit 50j indicates the zero level in this case.

In the second correlator, the output of the minimum value selecting circuit 50k indicates the zero level, and the signal G consisting of the changing waveform of sharp falling portion after crossing the zero level of the signal E and the changing waveform of rising portion of the signal D is obtained from the minimum value selecting circuit 50l.

Therefore, the signal H is obtained from the adder 50p which adds outputs of the adder 50m and adder 50n.

The above-mentioned maximum value selecting circuits and the minimum value selecting circuits may be structured by combination of switching circuits and comparison circuits.

Figure 4:
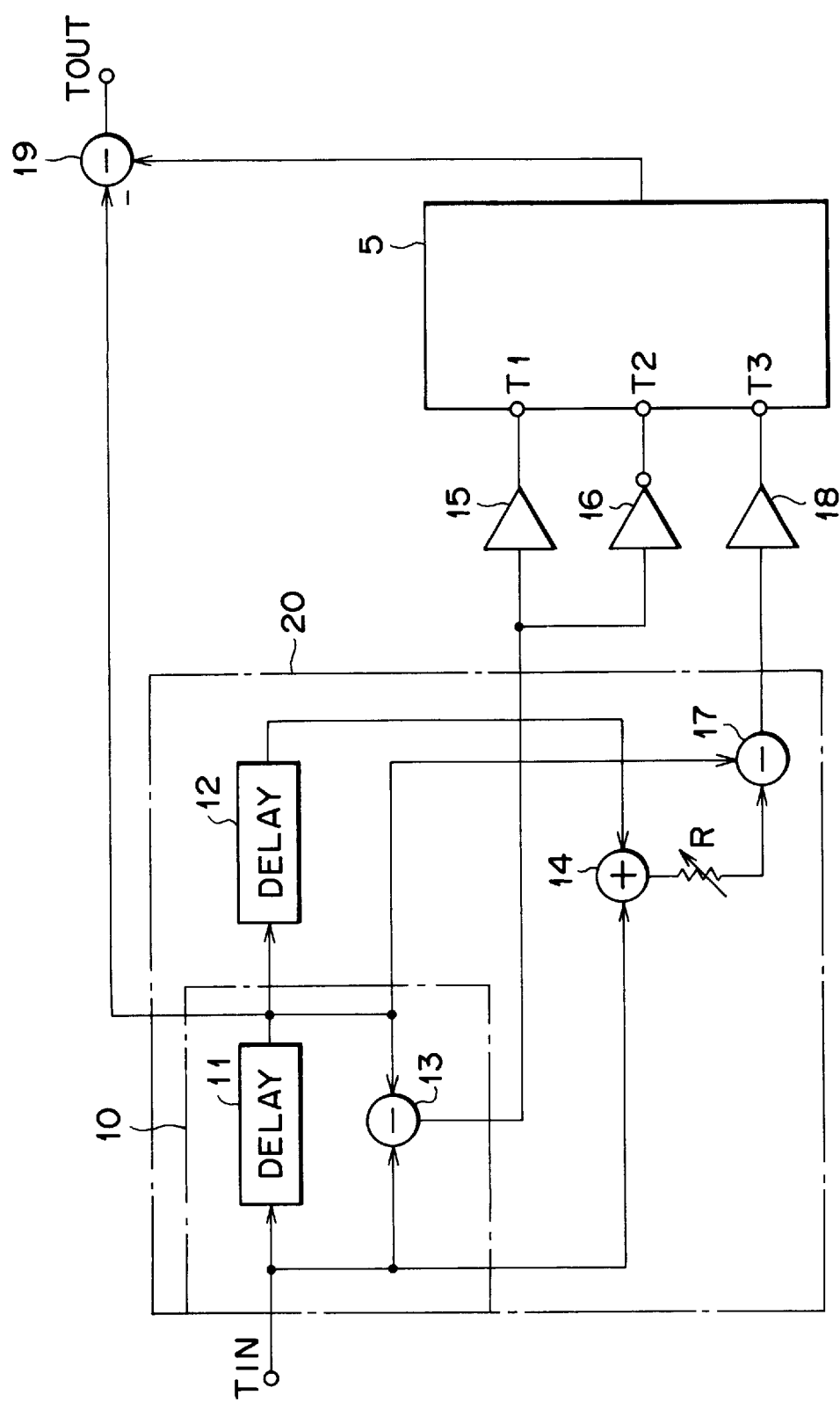
FIG. 4 is a block diagram for illustrating another embodiment of the present invention.
Figure 5A:
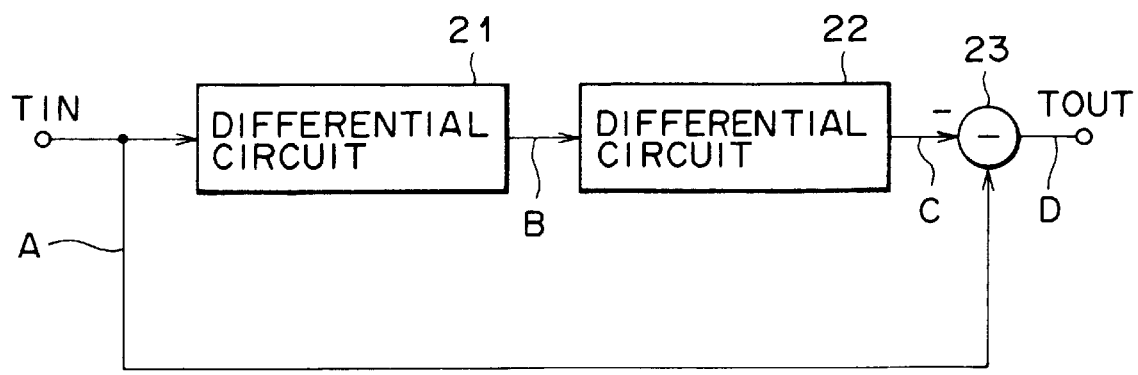
FIGS. 5A and 5B describe the principle of contour correction and a conventional example.
Figure 5B:
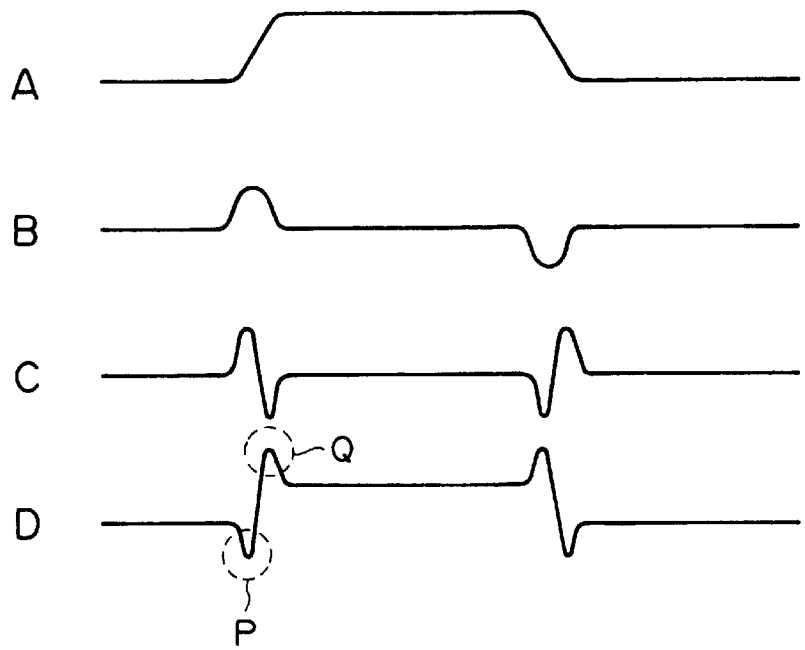

FIG. 4 is a block diagram for illustrating another embodiment of the present invention.

This circuit comprises the first delay circuit 11, second delay circuit 12, subtracting circuits 13 and 17, and adding circuit 14.

10 comprises the first delay circuit 11 and the subtracting circuit 13, which is called as sine filter. The output generated by subtracting input/output signal of the first delay circuit 11 is a signal having the first order differential signal waveform as widely known.

20 denotes a portion called as cosine filter including the portion which is to be the sine filter 10, and the output of the subtracter 17 corresponds to a signal having the second order differential waveform of the input signal.

Therefore, these outputs are supplied to the correlator 5 as shown in FIG. 3 by way of the amplifier 15, the inverted amplifier 16, and the amplifier 18, these outputs are subtracted by the subtracter 19 from the video signal which has been delayed by the first delay circuit 11 to thereby perform sharp output correction at the inflection point of the video signal as shown in FIG. 2, at that time, the contour is corrected with reduced preshoot portion and overshoot portion at the inflection point.

In the case of the exemplary circuit shown in FIG. 4, because the circuit comprises the delay circuits, subtracting circuit, and adding circuit, such circuit is useful for the case in which the digital video signal is subjected to signal processing as it is.

R denotes an attenuator for adjusting (approximately ½) the direct current component of the output signal of the subtracter 17 which is second order differential output so as to be zero.

In the present invention, the differential output is obtained by use of a sine filter and cosine filter which utilize an HPF or delay circuit, however other circuit means may be used as long as the circuit can extract high frequency signal component, also in such case, an contour-corrected signal having the low peak signal level at the preshoot portion and overshoot portion at the inflection point and having sharp rising and falling gradient at the middle point is obtained.

Further, in the above-mentioned embodiment, the rising inflection point of the video signal is described, but the present invention is effective for the falling inflection point of the video signal, and an contour-corrected signal having the low peak signal level at the preshoot portion and overshoot portion at the inflection point and having sharp rising and falling gradient at the middle point is obtained.

As described herein above, according to the video signal contour correcting circuit of the present invention, signal waveform processing is performed so that rising portion and falling portion are sharp with maintaining the preshoot and overshoot level of the contour correction signal relatively low.

What is claimed is:

1. A video signal contour correcting circuit comprising:

a first differential circuit for extracting the high frequency component of the video signal;

a second differential circuit for differentiating the output of said first differential circuit; and a correlator to which the output of said first differential circuit, the inverted output of said first differential circuit, and the output of said second differential circuit are supplied, wherein:

said correlator extracts the output of said first differential circuit of the front half of the portion before the inflection point of the video signal, the inverted output of said first differential circuit of the rear half of the portion after said inflection point, and the middle portion of the output of said second differential circuit, synthesizes said signal portions to form an contour correction signal; and the contour correction signal is overlapped to said input video signal to perform contour correction.

2. A video signal contour correcting circuit as claimed in claim 1, wherein said first and second differential circuits comprise a high pass filter, respectively.

3. A video signal contour correcting circuit as claimed in claim 1, wherein said first differential circuit comprises a sine filter, and said second differential circuit comprises a cosine filter.

4. A video signal contour correcting circuit as claimed in claim 1, wherein said correlator comprises a plurality of maximum value and minimum value selecting circuits having a set reference level.

5. A video signal contour correcting circuit as claimed in claim 3, wherein said first differential circuit comprises a first delay circuit and a subtracting circuit for subtracting the input signal, and said second differential circuit comprises an adding circuit for adding a second delay circuit for delaying the output of said first delay circuit to the input video signal, and a subtracting circuit for subtracting the output of said first delay circuit from the output of the adding circuit.

6. A video signal contour correcting circuit as claimed in claim 5, wherein said first delay circuit, second delay circuit and adding circuit, and subtracting circuit are structured with digital signal processing circuits.

* * * * *